(12) United States Patent
Takezawa et al.

(10) Patent No.: US 12,027,323 B2
(45) Date of Patent: Jul. 2, 2024

(54) CAPACITOR HAVING A SEALING MEMBER

(71) Applicant: SUN Electronic Industries Corp., Shijonawate (JP)

(72) Inventors: Takashi Takezawa, Shijonawate (JP); Masakazu Hosogi, Shijonawate (JP)

(73) Assignee: SUN Electronic Industries Corp., Shijonawate (JP)

( * ) Notice: Subject to any disclaimer, the term of this patent is extended or adjusted under 35 U.S.C. 154(b) by 122 days.

(21) Appl. No.: 17/802,019

(22) PCT Filed: Feb. 28, 2020

(86) PCT No.: PCT/JP2020/008505
§ 371 (c)(1),
(2) Date: Aug. 24, 2022

(87) PCT Pub. No.: WO2021/171609
PCT Pub. Date: Sep. 2, 2021

(65) Prior Publication Data
US 2023/0140448 A1    May 4, 2023

(51) Int. Cl.
*H01G 9/10* (2006.01)
*H01G 9/008* (2006.01)
(Continued)

(52) U.S. Cl.
CPC ............ *H01G 9/10* (2013.01); *H01G 9/008* (2013.01); *H01G 9/028* (2013.01); *H01G 9/035* (2013.01);
(Continued)

(58) Field of Classification Search
CPC .......... H01G 9/15; H01G 9/151; H01G 9/145; H01G 9/035; H01G 9/028; H01G 9/008; H01G 9/10
See application file for complete search history.

(56) References Cited

U.S. PATENT DOCUMENTS

| | | | |
|---|---|---|---|
| 6,128,179 | A | 10/2000 | Morokuma |
| 2002/0015278 | A1 | 2/2002 | Fukuyama et al. |

(Continued)

FOREIGN PATENT DOCUMENTS

| | | |
|---|---|---|
| CN | 101057306 A | 10/2007 |
| EP | 0464605 A2 | 1/1992 |

(Continued)

OTHER PUBLICATIONS

International Search Report (with partial translation) dated May 26, 2020, issued in corresponding International Patent Application No. PCT/JP2020/008505.

(Continued)

*Primary Examiner* — David M Sinclair
(74) *Attorney, Agent, or Firm* — Morgan, Lewis & Bockius LLP

(57) ABSTRACT

A capacitor includes a capacitor element that holds a predetermined solution between an anode foil and a cathode foil wound up with a separator in between, a body case that is formed in the shape of a bottomed tube closed at one end with a wall and open at the other end to have an opening, a liquid supply sheet that is arranged between the inner face of the case and the outer face of the element, and a sealing member that seals the opening. The solution has a sealing member deterioration preventing agent dissolved in a lipophilic solvent. The sheet has an absorption portion that makes contact with the separator to absorb the solution and a supply portion that makes contact with the sealing member to supply it with the solution.

13 Claims, 5 Drawing Sheets

(51) Int. Cl.
  *H01G 9/028* (2006.01)
  *H01G 9/035* (2006.01)
  *H01G 9/145* (2006.01)
  *H01G 9/15* (2006.01)

(52) U.S. Cl.
  CPC .............. *H01G 9/145* (2013.01); *H01G 9/15* (2013.01); *H01G 9/151* (2013.01)

(56) References Cited

U.S. PATENT DOCUMENTS

| | | |
|---|---|---|
| 2008/0316679 A1 | 12/2008 | Sugihara et al. |
| 2012/0300368 A1* | 11/2012 | Matsuura ............... H01G 9/145 361/506 |
| 2015/0255220 A1 | 9/2015 | Komatsu et al. |
| 2016/0035495 A1 | 2/2016 | Komatsu et al. |
| 2016/0099114 A1 | 4/2016 | Komatsu et al. |
| 2017/0162341 A1 | 6/2017 | Ashino et al. |
| 2021/0257166 A1 | 8/2021 | Kakuma |

FOREIGN PATENT DOCUMENTS

| | | | |
|---|---|---|---|
| JP | 2000-100670 A | | 4/2000 |
| JP | 2006-120830 A | | 5/2006 |
| JP | 2015162471 A | * | 9/2015 |
| JP | 2016-076562 A | | 5/2016 |
| WO | 2014/050913 A1 | | 4/2014 |
| WO | 2020/021679 A1 | | 1/2020 |

OTHER PUBLICATIONS

Extended European Search Report dated Dec. 13, 2023, issued in corresponding European Patent Application No. 20921528.4.

\* cited by examiner

CAPACITOR HAVING A SEALING MEMBER

TECHNICAL FIELD

The present invention relates to a capacitor provided with a sealing member.

BACKGROUND ART

A known capacitor is disclosed in Patent Document 1. This capacitor has a body case, a capacitor element, and a sealing member. The body case is formed of metal, in the shape of a bottomed tube, and its circumferential wall in a cylindrical shape is closed at one end and is left open at the other end to have an opening.

The capacitor element has an anode foil and a cathode foil, each having an oxide film formed on it, wound up with a separator in between, and is housed inside the body case. Between the anode and cathode foils, an electrolytic solution is held. To the anode and cathode foils, lead terminals are respectively connected. The opening of the body case having the capacitor element housed in it is sealed with a sealing member made of rubber or the like, and the lead terminals are led out of the body case through the sealing member.

According to general knowledge, when a polymer such as rubber is exposed to the energy of heat or light in the presence of oxygen as in air, the generation of a radical may trigger a chain of oxidation reactions and this leads to degraded physical properties. To cope with that, an antioxidant (anti-aging agent) for suppressing oxidation reactions is mixed in the sealing member.

Patent Documents 2 and 3 disclose capacitors having a solid electrolyte instead of an electrolytic solution. These capacitors have a body case, a capacitor element, and a sealing member like those described in Patent Document 1. Between the anode and cathode foils of the capacitor element, as the solid electrolyte, a conductive polymer is held. In the capacitors so configured, the conductive polymer helps reduce the ESR.

In the capacitor of Patent Document 3, a hydrophilic polymer compound is held between the anode and cathode foils. The hydrophilic polymer compound holds moisture, and with the moisture it can repair a defect in the oxide film formed on the anode foil.

CITATION LIST

Patent Literature

Patent Document 1: JP-A-2000-100670 (pages 2 to 4; FIG. 1)
Patent Document 2: JP-A-2016-76562 (pages 7 to 16; FIG. 2)
Patent Document 3: WO 2014/050913 (pages 9 to 23; FIG. 2)

SUMMARY OF INVENTION

Technical Problem

Today, as devices incorporating capacitors are made increasingly compact and high-performance, capacitors are increasingly arranged near motors, engines, fast-operating semiconductor devices, and the like that produce large amounts of heat. Thus, capacitors are increasingly used in high-temperature environments.

With the capacitor disclosed in Patent Document 1 mentioned above, the anti-aging agent mixed in the sealing member is consumed as it exerts an antioxidant effect, and is gradually depleted. When the capacitor is used in a high-temperature environment, as the anti-aging agent is depleted, the sealing member deteriorates rapidly. This often causes the electrolytic solution to evaporate out of the body case, often ending up in what is called a dried-up state. Hence the problem of the capacitor being unable to sustain its characteristics stably for a long period.

Likewise, when the capacitor disclosed in Patent Document 3 mentioned above is used in a high-temperature environment, the sealing member deteriorates. Thus, as the sealing member deteriorates, water held in the hydrophilic polymer compound between the anode and cathode foils leaks out of the body case, and this makes it impossible to repair the oxide film. Hence the problem of the capacitor being unable to sustain its characteristics stably for a long period.

This is true not only with a functional liquid that repairs oxide film: also with a functional liquid having a function of enhancing the characteristics of a capacitor, likewise, leakage of the functional liquid leads to the capacitor being unable to sustain its characteristics stably for a long period.

An object of the present invention is to provide a capacitor that can sustain its characteristics stably for a long period.

Solution to Problem

To achieve the above object, according to one aspect of the present invention, a capacitor includes: a capacitor element that holds a predetermined solution between an anode foil and a cathode foil wound up with a separator in between; a body case that is formed in the shape of a bottomed tube closed at one end with an end wall part and left open at the other end to have an opening and in which the capacitor element is housed; a liquid supply sheet that is arranged between the inner face of the body case and the outer face of the capacitor element; and a sealing member that seals the opening. The solution has a sealing member deterioration preventing agent dissolved in a lipophilic solvent. The liquid supply sheet has: an absorption portion that makes contact with the separator to absorb the solution; and a supply portion that makes contact with the sealing member to supply it with the solution.

According to another aspect of the present invention, in the capacitor described above, the absorption portion of the liquid supply sheet may be arranged to face the end wall part, and the liquid supply sheet may bend from the absorption portion to extend in the axial direction along the inner circumferential face of the body case.

According to another aspect of the present invention, in the capacitor described above, opposite end parts of the liquid supply sheet may be bent from the absorption portion to form the supplying portion in the opposite end parts.

According to another aspect of the present invention, in the capacitor described above, the width of the separator in the axial direction may be greater than the width of the anode and cathode foils in the axial direction, and the separator may protrude beyond the anode and cathode foils toward the end wall part.

According to another aspect of the present invention, in the capacitor described above, the liquid supply sheet may protrude beyond the capacitor element toward the sealing member.

According to another aspect of the present invention, in the capacitor described above, the supply portion of the liquid supply sheet extending in the axial direction may bent in the radial direction to be arranged to face the sealing member.

According to another aspect of the present invention, in the capacitor described above, the solution supplied to the sealing member through the supply portion may permeate the sealing member, a coating resulting from the sealing member deterioration preventing agent solidifying by oxidation may cover the outer face of the sealing member, and the solution may be present on the capacitor element side of the coating, inside the sealing member.

According to another aspect of the present invention, in the capacitor described above, the capacitor element may hold a solid electrolyte.

According to another aspect of the present invention, in the capacitor described above, the solution may be an electrolytic solution having, dissolved in the lipophilic solvent, the sealing member deterioration preventing agent and an electrolyte.

According to another aspect of the present invention, in the capacitor described above, the concentration of the sealing member deterioration preventing agent in the electrolytic solution may be from 1% by weight to 90% by weight.

According to another aspect of the present invention, in the capacitor described above, the concentration of the sealing member deterioration preventing agent in the electrolytic solution may be from 3% by weight to 80% by weight.

According to another aspect of the present invention, in the capacitor described above, the lipophilic solvent may be gamma-butyrolactone.

According to another aspect of the present invention, in the capacitor described above, the lipophilic solvent may be one of polyethylene glycol, glycerol, and polyglycerol coupled with a lipophilic group.

According to another aspect of the present invention, in the capacitor described above, the solution may contain: the lipophilic solvent; one of sulfolane, ethylene glycol, diethylene glycol, and polyethylene glycol; and an amphiphilic compound.

According to another aspect of the present invention, in the capacitor described above, the sealing member deterioration preventing agent may be a lipid-soluble vitamin.

According to another aspect of the present invention, in the capacitor described above, the lipid-soluble vitamin may be a tocopherol or tocotrienol.

Advantageous Effects of Invention

According to the present invention, a capacitor element holds a predetermined solution having a sealing member deterioration preventing agent dissolved in a lipophilic solvent, and a liquid supply sheet has an absorption portion that makes contact with a separator to absorb the solution and a supply portion that makes contact with the sealing member to supply it with the electrolytic solution. This permits the sealing member deterioration preventing agent to be supplied from the separator to the sealing member through the liquid supply sheet, and helps suppress deterioration of the sealing member by oxidation for a long period. It is thus possible to prevent the solution held in the capacitor element from leaking out, and to sustain the characteristics of the capacitor stably for a long period.

DESCRIPTION OF EMBODIMENTS

First Embodiment

Figure 1:
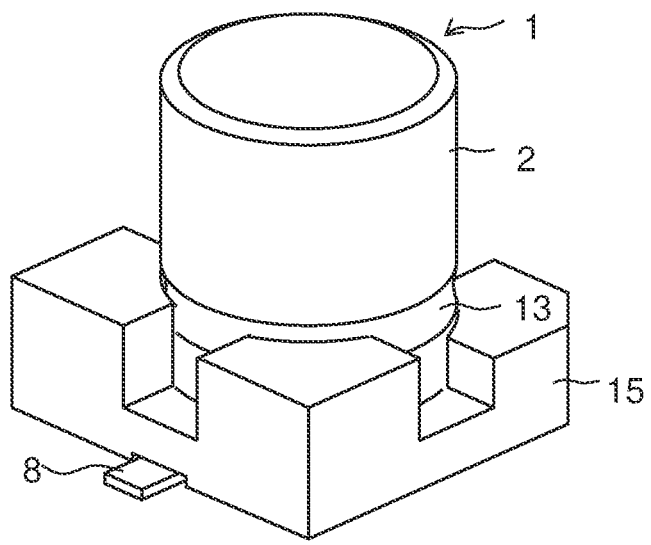
FIG. 1 is a perspective view of a capacitor according to a first and a second embodiment of the present invention, as seen from above.
Figure 2:
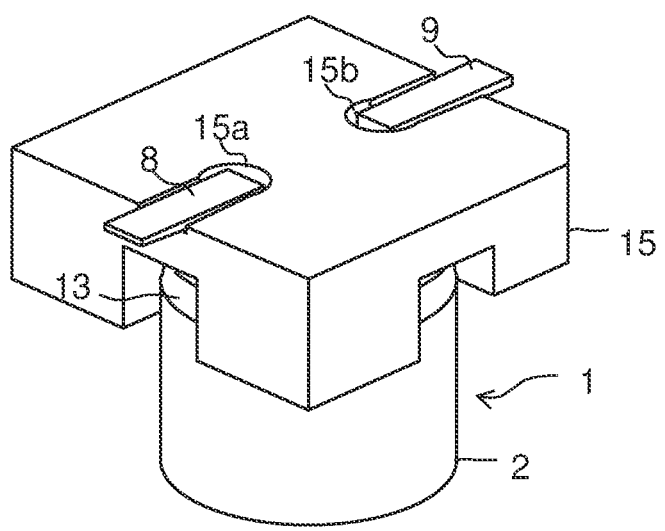
FIG. 2 is a perspective view of the capacitor according to the first and second embodiments of the present invention, as seen from below.

Hereinafter, embodiments of the present invention will be described with reference to the accompanying drawings. FIGS. 1 and 2 are perspective views of a capacitor 1 according to a first embodiment of the present invention, as seen from above and below respectively. The capacitor 1 is an electrolytic capacitor, and is mounted on a seat plate 15. The seat plate 15 is formed of synthetic resin, and holds the capacitor 1. The seat plate 15 has a pair of through-holes 15a and 15b formed in it.

The capacitor 1 has lead terminals 8 and 9, which are led through the through-holes 15a and 15b in the seat plate 15 and are then bent outward. Thus, with the top face of a body case 2 held by an automated machine, the capacitor 1 is positioned on a circuit hoard, and is mounted there with the lead terminals 8 and 9 soldered on lands on the circuit board.

Figure 3:
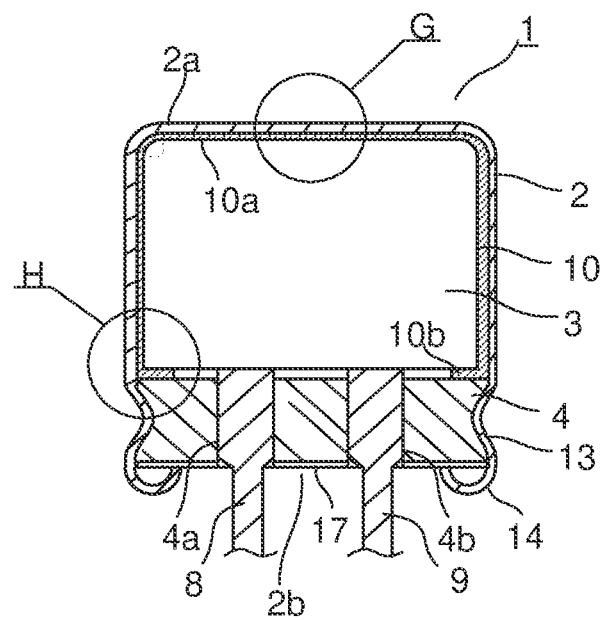
FIG. 3 is a sectional front view of the capacitor according to the first and second embodiments of the present invention.

FIG. 3 is a sectional front view of the capacitor 1. The capacitor 1 has a body case 2, a capacitor element 3, a sealing member 4, and a liquid supply sheet 10. The body case 2 is formed of metal such as aluminum, in the shape of a bottomed tube with a circular sectional shape that is, at one end, closed with an end wall part 2a and is, at the other end, left open to have an opening 2b. The capacitor element 3 is housed inside the body case 2, and the opening 2b is sealed with the sealing member 4.

Figure 4:
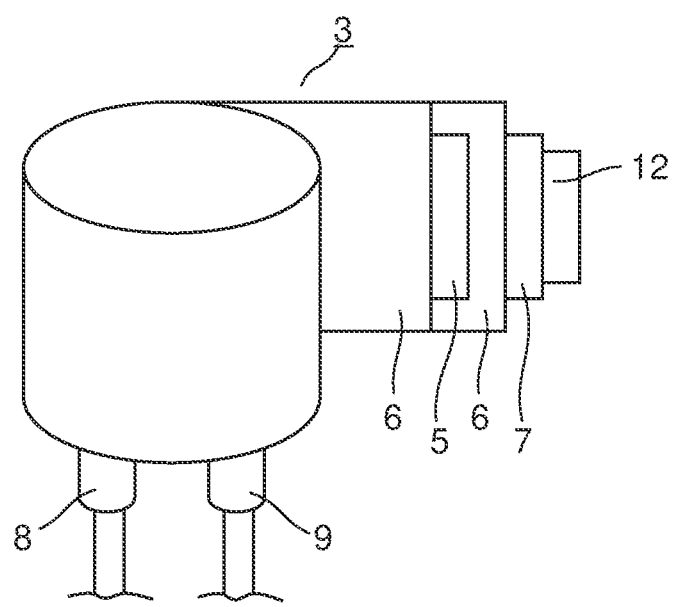
FIG. 4 is a perspective view showing a capacitor element in the capacitor according to the first and second embodiments of the present invention.

FIG. 4 is a perspective view of the capacitor element 3. The capacitor element 3 includes an anode foil 5, a cathode foil 7, and a separator 6. The anode and cathode foils 5 and 7 are each formed of metal foil, in the shape of an elongate strip. The separator 6 is formed of non-woven fabric or the like, in the shape of an elongate strip.

The capacitor element 3 is formed by winding up the anode and cathode foils 5 and 7, with the separator 6 in between, into a cylindrical shape. The anode foil 5, the cathode foil 7, and the separator 6, each in the shape of a strip, are elongate in the winding direction (longitudinal direction, longer-side direction), and their width in the direction (lateral direction, shorter-side direction) orthogonal to the winding direction is smaller than their length in the winding direction. The terminal end of the anode or cathode foil 5 or 7 is fastened with tape 12. To the anode foil 5, the lead terminal 8 is connected and, to the cathode foil 7, the lead terminal 9 is connected.

The width of the separator 6 in the axial direction (lateral direction) is larger than the widths of the anode and cathode foils 5 and 7 in the axial direction. Thus, with respect to the anode and cathode foils 5 and 7, the separator 6 protrudes beyond them upward (toward the end wall part 2a) and downward (toward the opening 2b), and this prevents short-circuiting between the anode and cathode foils 5 and 7.

The anode foil 5 is formed of a valve metal such as aluminum, tantalum, niobium, or titanium. The cathode foil 7 faces the anode foil 5 across the separator 6, and is formed of aluminum or the like. The anode and cathode foils 5 and 7 have an oxide film (not shown) formed on their surfaces.

Between the anode and cathode foils 5 and 7 of the capacitor element 3, an electrolytic solution is held. Immersing the capacitor element 3 in the electrolytic solution for a predetermined time permits the electrolytic solution to permeate the separator 6, to be held between the anode and cathode foils 5 and 7. The electrolytic solution functions as the actual cathode. The electrolytic solution also helps repair defects in the oxide films on the anode and cathode foils 5 and 7.

The electrolytic solution is a solution having, dissolved in a lipophilic solvent, an electrolyte and a sealing member deterioration preventing agent. In this embodiment, as the lipophilic solvent, gamma-butyrolactone is used. Also usable as the lipophilic solvent is one of polyethylene glycol, glycerol, and polyglycerol coupled with a lipophilic group. For easy permeation of the sealing member deterioration preventing agent in the sealing member 4, it is preferable that the lipophilic solvent contain gamma-butyrolactone.

As the solvent in the electrolytic solution, it is possible to use, along with the lipophilic solvent, sulfolane, ethylene glycol, diethylene glycol, polyethylene glycol, or the like. Here, as necessary, an amphiphilic compound may be added. Usable as the amphiphilic compound is, for example, a derivative of polyethylene glycol, or a copolymer of polyethylene glycol with polypropylene glycol.

The electrolyte, by dissolving in the solvent, dissociates into ions to exert electrical conductivity, and used as the electrolyte is, for example, an organic amine salt of a boric acid compound or of a carboxylic acid compound.

The sealing member deterioration preventing agent is a compound that permeates the sealing member 4 by dissolving in the lipophilic solvent. In simple terms, as the sealing member deterioration preventing agent, it is possible to use a compound of which the weight as observed after the sealing member 4 is immersed for one week in a solution having the sealing member deterioration preventing agent dissolved in the lipophilic solvent at a concentration of 10% and then the solution on the surface is wiped off exhibits an increase compared with a sealing member 4 immersed in the lipophilic solvent alone.

Specifically, usable as the sealing member deterioration preventing agent is, for example, a terpenoid such as a lipid-soluble vitamin containing an isoprene skeleton (of which the main chain may have single or double bonds or may have a ring structure) within the molecule, a saturated fatty acid, an unsaturated fatty acid, a polyglycerol ester, or a derivative of any of those. To ease dissolution of any such sealing member deterioration preventing agent in the lipophilic solvent, a non-ionic surfactant or an amphiphilic compound may be added.

Examples of lipophilic vitamins include vitamin A (retinol, α-carotene, β-carotene, and β-cryptoxanthin), vitamin D (vitamin D2 and vitamin D3), vitamin E (α-tocopherol, β-tocopherol, γ-tocopherol, δ-tocopherol, α-tocotrienol, β-tocotrienol, γ-tocotrienol, and δ-tocotrienol), and vitamin K (vitamin K1, vitamin K2, and menaquinone-7).

Examples of polyglycerol esters include tetraglycerol triesters having oleic acid as a fatty acid group.

In FIG. 3, the sealing member 4 is formed as a molding of an insulating elastic material, in the shape of a disc, and has a pair of through-holes 4a and 4b. The lead terminals 8 and 9 of the capacitor element 3 are press-fitted through the through-holes 4a and 4b. Usable for the sealing member 4 is, for example, butyl rubber, silicone rubber, or fluorine-containing rubber.

Butyl rubber is preferred because it is high in environmental resistance, such as heat aging resistance, chemical resistance, and weather resistance, high in electrical insulation, and low in gas permeation. Silicone rubber and fluorine-containing rubber, though less airtight than butyl rubber, can be given higher airtightness by coating the outer face of the sealing member 4 with a coating 17, which will be described later.

The liquid supply sheet 10 is formed, for example, by shaping cellulose fiber into a sheet in the shape of a strip, and is arranged between the inner face of the body case 2 and the outer face of the capacitor element 3. The liquid supply sheet 10 has an absorption portion 10a and a supply portion 10b. The absorption portion 10a is arranged to face the end wall part 2a, and makes contact with the separator 6 in the capacitor element 3 to absorb the electrolytic solution containing the sealing member deterioration preventing agent. The supply portion 10b makes contact with the sealing member 4, and supplies the electrolytic solution absorbed from the separator 6 to the sealing member 4.

Opposite side parts of the liquid supply sheet 10 are bent to extend, from the absorption portion 10a facing the end wall part 2a, in the axial direction along the inner circumferential face 2c of the body case 2. Extending in the axial direction, the liquid supply sheet 10 protrudes beyond the capacitor element 3 toward the sealing member 4, and is then bent in the radial direction to be arranged to face the sealing member 4. In this way, the supply portion 10b is formed in the opposite end parts of the liquid supply sheet 10.

Figure 5:
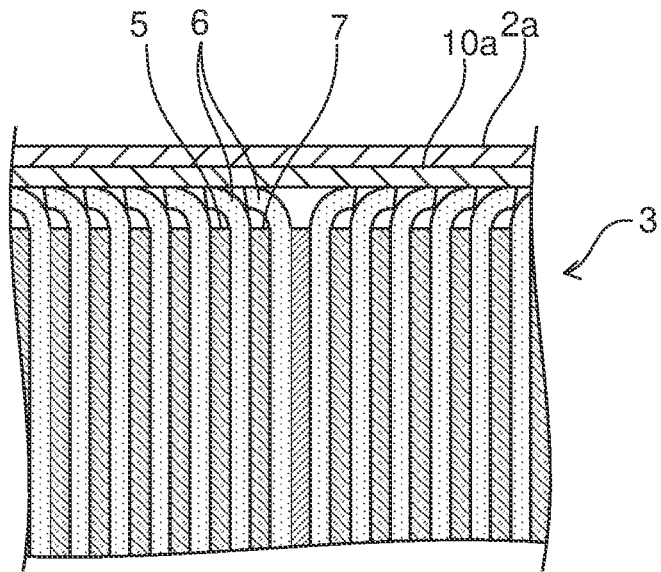
FIG. 5 is a detailed view of part G in FIG. 3.
Figure 6:
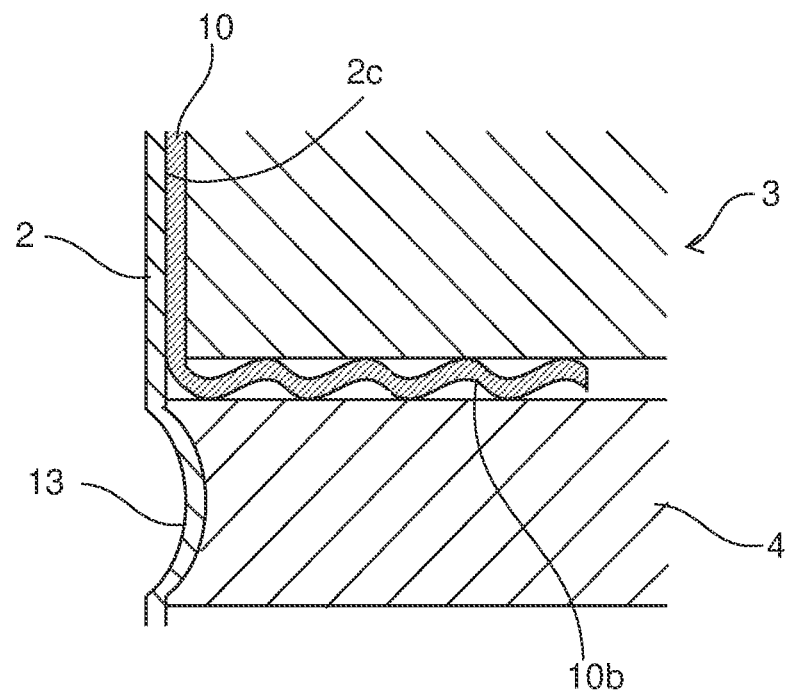
FIG. 6 is a detailed view of part H in FIG. 3.

FIGS. 5 and 6 are detailed views of parts G and H, respectively, in FIG. 6. At least part of the separator 6, which protrudes beyond the anode and cathode foils 5 and 7 toward the end wall part 2a, makes contact, at a plurality of points or over an area, with the absorption portion 10a. Likewise, the supply portion 10b, resulting from bending opposite end parts of the liquid supply sheet 10 in the radial direction, makes contact, at a plurality of points or over an area, with the sealing member 4.

The electrolytic solution absorbed from the separator 6 through the absorption portion 10a is constantly supplied to the sealing member 4 through the supply portion 10b. The sealing member deterioration preventing agent contained in the electrolytic solution permeates the sealing member 4 through the intermolecular gaps in the sealing member 4. It is thus possible, with the sealing member deterioration preventing agent, to suppress deterioration of the sealing member 4 by oxidation for a long period, and to prevent evaporation of the electrolytic solution via a crack or the like in the sealing member 4.

The electrolytic solution permeating the sealing member 4 reaches the outer face (the face facing away from the capacitor element 3) of the sealing member 4. Thus, the outer face of the sealing member 4 is covered with the electrolytic solution in the form of oil film.

The sealing member deterioration preventing agent on the outer face of the sealing member 4, when exposed to high temperature in the presence of oxygen in air, solidifies by oxidation. Thus, as the capacitor 1 according to this embodiment is subjected to high-temperature treatment, the outer face of the sealing member 4 is covered with a coating 17 resulting from the sealing member deterioration preventing agent solidifying by oxidation. The outer face of the sealing member 4 may be covered with oil film; however, as will be described in detail later, by covering it with the coating 17, it is possible to more reliably prevent evaporation of the electrolytic solution due to deterioration of the sealing member 4.

Permeated with the electrolytic solution, the liquid supply sheet 10 is in a swollen state. This reduces the range of movement of the capacitor element 3 inside the body case 2, and helps enhance the vibration resistance of the capacitor element 3.

Instead, the absorption portion 10a facing the end wall part 2a may be provided at one end of the liquid supply sheet 10, and the supply portion 10b may be provided at the other end. It is however more preferable to form the liquid supply sheet 10 in a U-shape and provide the absorption portion 10a in a middle part and the supply portion 10b at opposite end parts as in this embodiment, because this ensures reliable, supply of the sealing member deterioration preventing agent to the sealing member 4.

With the sealing member 4 placed in the opening 2b of the body case 2, the body case 2 is swaged by being pressed on its outer circumferential face from the outside. This forms a constriction (inward bead) 13 that protrudes inward of the body case 2. The constriction 13 constricts the outer circumferential face of the sealing member 4 inward, and thereby brings it into close contact with the inner circumferential face of the body case 2. Moreover, constricting the sealing member 4 brings the inner faces of the through-holes 4a and 4b into close contact with the lead terminals 8 and 9. Thus, the opening 2b of the body case 2 is sealed with the sealing member 4 so that the electrolytic solution held in the capacitor element 3 may not leak out of the body case 2.

The open end of the body case 2 is folded onto the outer face (facing away from the capacitor element 3) of the sealing member 4 to form a replicated portion 14. The replicated portion 14 and the constriction 13 prevent the sealing member 4 from dropping out of the body case 2.

The capacitor 1 is manufactured through an element formation process, an element housing process, a sealing member fitting process, a molding process, and a repair process performed in this order. In the element formation process, the anode foil 5 fitted with the lead terminal 8 and the cathode foil 7 fitted with the lead terminal 9 are wound up with the separator 6 held in between, and these are immersed in the electrolytic solution for a predetermined time to form the capacitor element 3.

Figure 7:
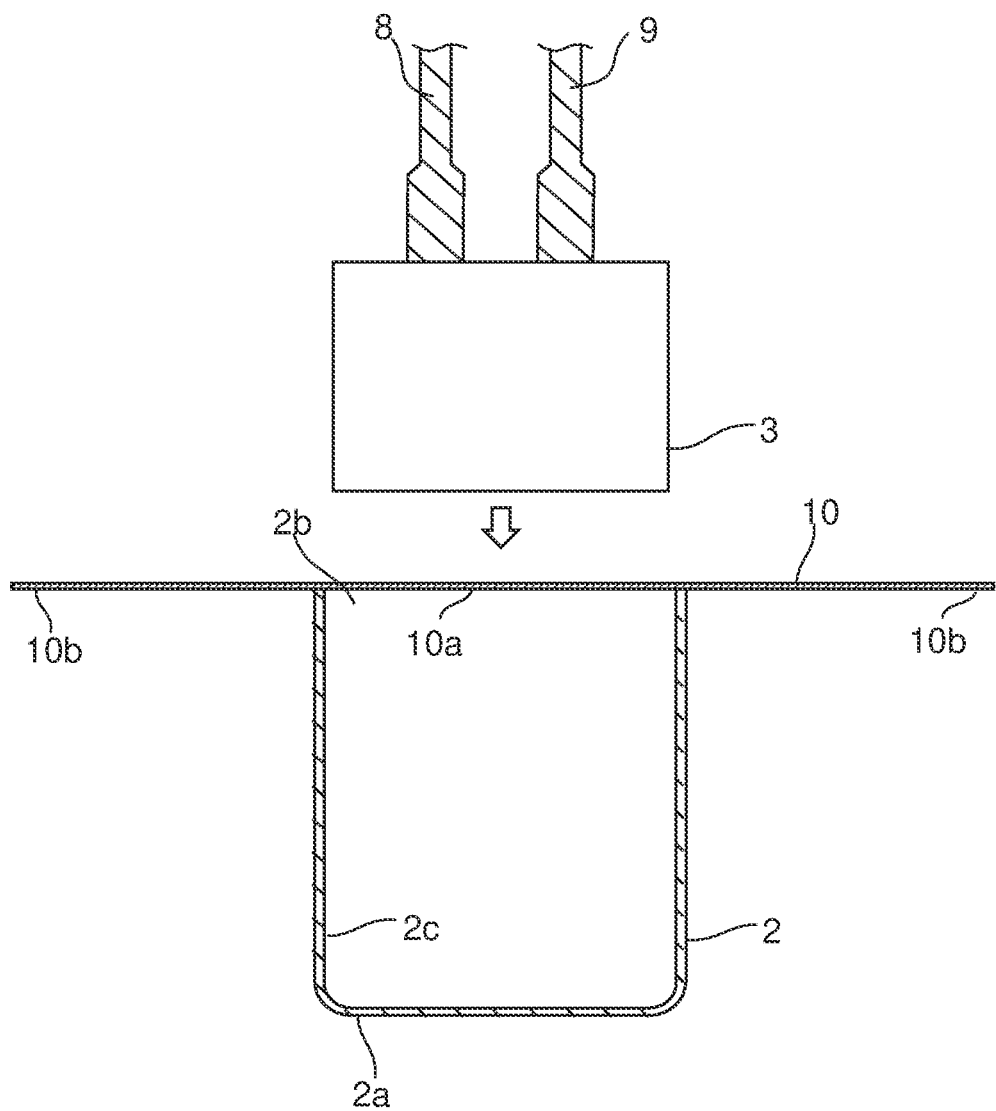
FIG. 7 is a sectional front view showing an element housing process for the capacitor according to the first and second embodiments of the present invention.
Figure 8:
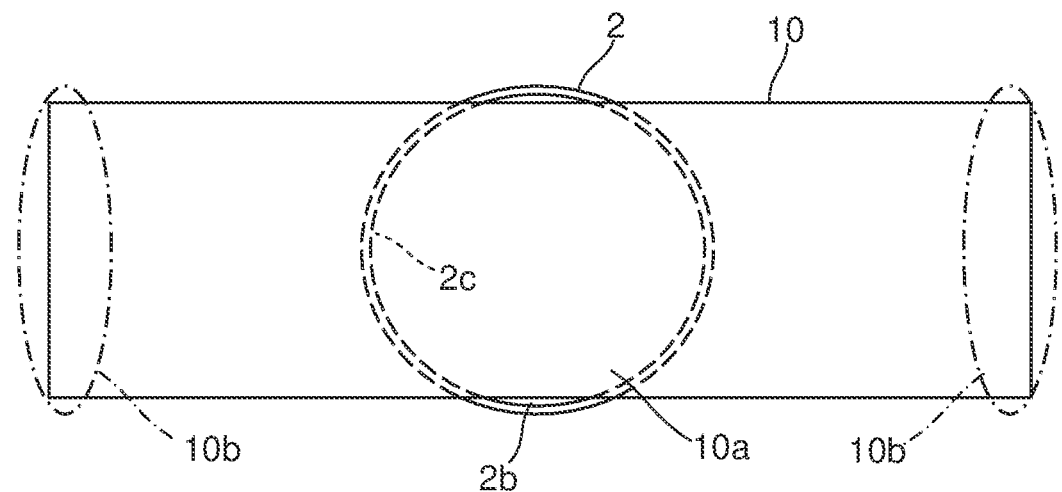
FIG. 8 is a plan view showing the element housing process for the capacitor according to the first and second embodiments of the present invention.

FIGS. 7 and 8 are a sectional front view and a plan view, respectively, showing the element housing process. In the element housing process, a middle part of the strip-shaped liquid supply sheet 10 in the longitudinal direction is placed on the opening 2b of the body case 2. The width of the liquid supply sheet 10 in the lateral direction is equal to or slightly smaller than the inner diameter of the body case 2. Then, from above the liquid supply sheet 10, the capacitor element 3 is inserted into the body case 2, so that the liquid supply sheet 10 is pushed into the body case 2.

In this way, the liquid supply sheet 10 is arranged in an U-shape between the inner face of the body case 2 and the outer face of the capacitor element 3 housed inside the body case 2. The middle part of the liquid supply sheet 10 in the longitudinal direction forms the absorption portion 10a that faces the end wall part 2a and makes contact with the separator 6 (see FIG. 5). On the other hand, opposite end parts of the liquid supply sheet 10 in the longitudinal direction protrude beyond the capacitor element 3 housed inside the body case 2, toward the opening 2b (toward the sealing member 4) (see FIG. 9).

Figure 9:
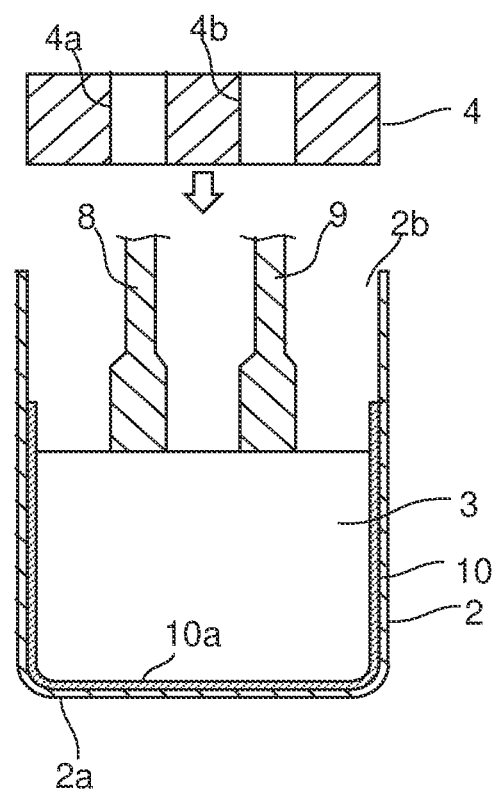
FIG. 9 is a sectional front view showing a sealing member fitting process for the capacitor according to the first and second embodiments of the present invention.

FIG. 9 is a sectional front view showing the sealing member fitting process. In the sealing member fitting process, the sealing member 4 is inserted, from the opening 2b side, into the body case 2, now with the capacitor element 3 housed in it, to be fitted to the body case 2. The lead terminals 8 and 9 of the capacitor element 3 are press-fitted through the through-holes 4a and 4b in the sealing member 4. Meanwhile, the opposite end parts of the liquid supply sheet 10 in the longitudinal direction are pushed by the sealing member 4 to be bent in the radial direction, and form the supply portion 10b that makes contact with the inner face (the face facing the capacitor element 3) of the sealing member 4.

In the molding process, by swaging, the constriction 13 that protrudes inward of the body case 2 is formed, and the open end of the body case 2 is folded to form the replicated portion 14.

In the repair process, the oxide films formed on the anode and cathode foils 5 and 7 are repaired. The repair involves, for example, applying a voltage of 35 V between the lead terminals 8 and 9 for 30 minutes in a high-temperature environment of 125° C. The sealing member deterioration preventing agent that has reached the outer face of the sealing member 4 solidifies by oxidation in the high-temperature environment to form the coating 17. Here, the electrolytic solution containing the sealing member deterioration preventing agent is present on the capacitor element 3 side of the coating 17, inside the sealing member 4.

Thus, the outer face of the sealing member 4 is covered with the coating 17, and this makes the entire sealing member 4 unlikely to be exposed to oxygen outside the body case 2. Moreover, even if part of the coating 17 deteriorates, that part is supplied with the electrolytic solution in liquid form present inside the sealing member 4, and the sealing member deterioration preventing agent solidifies to repair the coating 17. It is thus possible to suppress deterioration resulting from oxidation of the sealing member 4 for a longer period. It is hence possible to more reliably prevent evaporation of the electrolytic solution via a crack or the like in the sealing member 4.

The coating 17 may be formed in the repair process or in a process other than the repair process. A high-temperature environment hastens the supply of the electrolytic solution to the sealing member 4, and expedites the oxidation reaction of the sealing member deterioration preventing agent. Accordingly, it is preferable that the coating be formed at a temperature of 105° C. or higher, and more preferably 125° C. or higher. In a case, however, where the sealing member deterioration preventing agent is a saturated fatty acid or an ester compound of a saturated fatty acid, its solidification reaction takes time; thus it is preferable that the coating 17 be formed at a temperature of 160° C. or higher.

To sufficiently promote the formation of the coating 17, it is preferable that the duration of the treatment in a high-temperature environment be 30 minutes or more; at a temperature of 160° C. however, the duration may be shorter.

It is preferable that the concentration of the sealing member deterioration preventing agent in the electrolytic solution be from 1% by weight to 90% by weight. If the concentration of the sealing member deterioration preventing agent in the electrolytic solution is less than 1% by weight, it is not possible to sustain the effect of suppressing oxidation of the sealing member 4 for a long period. On the other hand, if the concentration of the sealing member deterioration preventing agent in the electrolytic solution is more than 90% by weight, the electrolytic solution has increased viscosity. This increases the time required to make the capacitor element 3 hold the electrolytic solution and the time required to supply the electrolytic solution from the capacitor element 3 to the sealing member 4, leading to increased man-hours for the capacitor 1. A concentration of 3% by weight to 80% by weight of the sealing member deterioration preventing agent in the electrolytic solution is particularly preferable to achieve more effective suppression of oxidation and hence reduced man-hours.

The capacitor 1 was then subjected to a durability test in a high-temperature environment of 150° C. to study how its capacitance varied with time. For the electrolytic solution of the capacitor 1 of this embodiment, gamma-butyrolactone was used as the lipophilic solvent, and α-tocopherol was used as the sealing member deterioration preventing agent. The concentration of the sealing member deterioration preventing agent in the electrolytic solution was 10% by weight. For comparison with this embodiment, a comparative example in which the electrolytic solution contained no sealing member deterioration preventing agent was subjected to the durability test as well. In both of the capacitors 1 of this embodiment and of the comparative example, the sealing member 4 was formed of butyl rubber.

The durability test revealed the following. The capacitor 1 according to this embodiment exhibited, as compared with its initial capacitance, a variation of 20% or less in capacitance in 8 000 hours. It can thus sustain its characteristics stably for a long period in a high-temperature environment.

In contrast, the comparative example developed an unwanted path (crack) in the sealing member 4 in 4000 hours and thus, as a result of the electrolytic solution evaporating rapidly, exhibited a sharp drop of more than 30% in capacitance from its initial capacitance. This makes quality assurance in a high-temperature environment difficult.

According to this embodiment, the capacitor element 3 holds an electrolytic solution that is a solution having a sealing member deterioration preventing agent dissolved in a lipophilic solvent, and the liquid supply sheet 10 has an absorption portion 10a that makes contact with the separator 6 to absorb the electrolytic solution and a supply portion 10b that makes contact with the sealing member 4 to supply it with the electrolytic solution. This permits the sealing member deterioration preventing agent to be supplied from the separator 6 to the sealing member 4 through the liquid supply sheet 10, and this helps suppress deterioration of the sealing member 4 by oxidation for a long period. It is thus possible to prevent the electrolytic solution held in the capacitor element 3 from leaking out, and to sustain the characteristics of the capacitor 1 stably for a long period.

The absorption portion 10a of the liquid supply sheet 10 is arranged to face the end wall part 2a, and the liquid supply sheet 10 bends from the absorption portion 10a to extend in the axial direction along the inner circumferential face 2c of the body case 2. It is thus easy to form an absorption portion 10a that makes contact with the separator 6 and a supply portion 10b that makes contact with the sealing member 4.

Opposite end parts of the liquid supply sheet 10 are bent from the absorption portion 10a to form the supply portion 10b in the opposite end parts. Thus, by placing the liquid supply sheet 10 on the opening 2b of the body case 2 and inserting the capacitor element into it, it is easy to form the absorption portion 10a and the supply portion 10b.

The separator 6 protrudes beyond the anode and cathode foils 5 and 7 toward the end wall part 2a. It is thus possible to reliably keep the liquid supply sheet 10 in contact with the separator 6 to form the absorption portion 10a.

The liquid supply sheet 10 protrudes beyond the capacitor element 3 toward the sealing member 4. It is thus possible to reliably keep the liquid supply sheet 10 in contact with the sealing member 4 to form the supply portion 10b.

The supply portion 10b is arranged by bending the liquid supply sheet 10, which extends in the axial direction, in the radial direction to face the sealing member 4, and this helps increase the area of contact of the supply portion 10b with the sealing member 4. It is thus possible to reliably supply the electrolytic solution to the sealing member 4.

The coating 17 covers the outer face of the sealing member 4, and the electrolytic solution permeates the sealing member 4 to be present on the capacitor element 3 side of the coating 17, inside the sealing member 4. It is thus possible to suppress deterioration of the sealing member 4 by oxidation for a longer period, and to sustain the characteristics of the capacitor 1 for a longer period.

A concentration of 1% by weight to 90% by weight of the sealing member deterioration preventing agent in the electrolytic solution helps suppress an increase in man-hours, and helps suppress deterioration of the sealing member 4 for a long period.

A concentration of 3% by weight to 80% by weight of the sealing member deterioration preventing agent in the electrolytic solution helps further suppress an increase in man-hours, and helps suppress deterioration of the sealing member 4 for a long period.

Using gamma-butyrolactone as the lipophilic solvent in the electrolytic solution makes it easy to prepare an electrolytic solution having a sealing member deterioration preventing agent dissolved in it.

Mixing at least one of sulfolane, ethylene glycol, and diethylene glycol and a non-ionic surfactant in the lipophilic solvent in the electrolytic solution makes it easy to prepare an electrolytic solution having a sealing member deterioration preventing agent dissolved in it.

Using polyethylene glycol coupled with a lipophilic group or a copolymer of polyethylene glycol with polypropylene glycol as the lipophilic solvent in the electrolytic solution makes it easy to prepare an electrolytic solution having a sealing member deterioration preventing agent dissolved in it.

With a lipid-soluble vitamin such as a tocopherol or tocotrienol, it is easy to prepare a sealing member deterioration preventing agent that prevents deterioration of the sealing member 4 by oxidation.

Second Embodiment

Next, a second embodiment will be described. In this embodiment, a capacitor element 3 holds, instead of an electrolytic solution, a solid electrolyte (not shown) along with a predetermined functional liquid. Otherwise this embodiment is similar to the first embodiment.

The solid electrolyte is formed of a conductive polymer or the like. The conductive polymer helps reduce the ESR of the capacitor 1. Usable as the conductive polymer is, for example, polythiophene, polypyrrole, or a derivative of any of those. Polyethylene dioxythiophene is particularly preferable for its high electrical conductivity.

Immersing the capacitor element 3 in a dispersion liquid of the conductive polymer for a predetermined time and then drying the result permits the solid electrolyte formed of the conductive polymer to be held between the anode and cathode foils 5 and 7.

Also held between the anode and cathode foils 5 and 7 is a functional liquid with a function of further reducing the ESR of the capacitor 1. Immersing the capacitor element 3 in the functional liquid for a predetermined time permits the functional liquid to permeate the separator 6 to be held between the anode and cathode foils 5 and 7.

The functional liquid is a solution having a sealing member deterioration preventing agent dissolved in a lipophilic solvent. Usable as the lipophilic solvent is, for example, one that contains at least one of sulfolane, ethylene glycol, and diethylene glycol along with a nonionic surfactant. Also usable as the lipophilic solvent is polyethylene glycol having a lipophilic group bonded to it, or an amphiphilic polymer compound such as a copolymer of polyethylene glycol with polypropylene glycol. For satisfactory permeation of the sealing member deterioration preventing agent in the sealing member 4, it is preferable that gamma-butyrolactone be mixed.

Usable as the sealing member deterioration preventing agent is, as described previously, a lipid-soluble vitamin, a saturated fatty acid, an unsaturated fatty acid, a polyglycerol ester, or a derivative of any of those. To ease dissolution of any such sealing member deterioration preventing agent in the lipophilic solvent, a non-ionic surfactant or an amphiphilic polymer compound may be added.

Examples of lipophilic vitamins include vitamin A (retinol, α-carotene, β-carotene, and β-cryptoxanthin), vitamin D (vitamin D2 and vitamin D3), vitamin E (α-tocopherol, β-tocopherol, γ-tocopherol, δ-tocopherol, α-tocotrienol, β-tocotrienol, γ-tocotrienol, and δ-tocotrienol), and vitamin K (vitamin K1, vitamin K2, and menaquinone-7).

The functional liquid brings the solid electrolyte into a swollen state, and this increases the closeness of contact of the solid electrolyte with the anode and cathode foils 5 and 7 holding the solid electrolyte in between. This helps reduce the ESR of the capacitor 1.

As in the first embodiment, of the liquid supply sheet 10, the absorption portion 10a makes contact with the separator 6 in the capacitor element 3, and the supply portion 10b makes contact with the sealing member 4, The sealing member 4 is constantly supplied with the functional liquid through the liquid supply sheet 10. The functional liquid permeates the sealing member 4 through the intermolecular gaps in the sealing member 4. It is thus possible, with the sealing member deterioration preventing agent contained in the functional liquid, to suppress deterioration of the sealing member 4 by oxidation for a long period, and to prevent evaporation of the functional liquid via a crack or the like in the sealing member 4.

The outer face of the sealing member 4 is covered with a coating 17 resulting from the sealing member deterioration preventing agent solidifying by oxidation, and this makes the entire sealing member 4 unlikely to be exposed to oxygen outside the body case 2. Moreover, even if part of the coating 17 deteriorates, that part is supplied with the functional liquid in liquid form present inside the sealing member 4, and the sealing member deterioration preventing agent solidifies to repair the coating 17. It is thus possible to suppress deterioration resulting from oxidation of the sealing member 4 for a longer period. It is hence possible to more reliably prevent evaporation of the functional liquid via a crack or the like in the sealing member 4.

Permeated with the functional liquid, the liquid supply sheet 10 is in a swollen state. This reduces the range of movement of the capacitor element 3 inside the body case 2, and helps enhance the vibration resistance of the capacitor element 3.

According to this embodiment, the capacitor element 3 holds a functional liquid that is a solution having a sealing member deterioration preventing agent dissolved in a lipophilic solvent, and the liquid supply sheet 10 has an absorption portion 10a that makes contact with the separator 6 to absorb the functional liquid and a supply portion 10b that makes contact with the sealing member 4 to supply it with the functional liquid. This permits the sealing member deterioration preventing agent to be supplied from the separator 6 to the sealing member 4 through the liquid supply sheet 10, and this helps suppress deterioration of the sealing member 4 by oxidation for a long period. It is thus possible to prevent the functional liquid held in the capacitor element 3 from leaking out, and to sustain the characteristics of the capacitor 1 stably for a long period.

The coating 17 covers the outer face of the sealing member 4, and the functional liquid permeates the sealing member 4 to be present on the capacitor element 3 side of the coating 17, inside the sealing member 4. It is thus possible to suppress deterioration of the sealing member 4 by oxidation for a longer period, and to sustain the characteristics of the capacitor 1 for a longer period.

While in this embodiment the functional liquid functions to reduce the ESR of the capacitor 1, the functional liquid may have a function of enhancing any other characteristics of the capacitor 1 (a function of repairing defects in the oxide films on the anode and cathode foils, a function of increasing the withstand voltage of the capacitor 1, and the like).

Instead of the functional liquid, an electrolytic solution like the one in the first embodiment may be held between the anode and cathode foils 5 and 7. Holding a solid electrolyte along with an electrolytic solution between the anode and cathode foils 5 and 7 helps further reduce the ESR of the capacitor 1.

While in the first and second embodiments the capacitor element 3 holds a solid electrolyte or an electrolytic solution, a capacitor 1 may hold a functional liquid as in the second embodiment without holding a solid electrolyte or an electrolytic solution.

INDUSTRIAL APPLICABILITY

The present invention finds applications in capacitors such as electrolytic capacitors, and in vehicles, electronic devices, and the like that incorporate circuits including capacitors.

REFERENCE SIGNS LIST 1 capacitor
2 body case
2a end wall part
2b opening
2c inner circumferential face
3 capacitor element
4 sealing member
4a, 4b through-hole
5 anode foil
6 separator 7 cathode foil
8, 9 lead terminal
10 liquid supply sheet
10a absorption portion
10b supply portion
12 tape
13 constriction
14 replicated portion
15 seat plate
16 through-hole
17 coating

The invention claimed is:

1. A capacitor, comprising:
   a capacitor element that holds a predetermined solution between an anode foil and a cathode foil wound up with a separator in between;
   a body case
      that is formed in a shape of a bottomed tube closed at one end with an end wall part and left open at another end to have an opening and
      in which the capacitor element is housed,
   a liquid supply sheet that is arranged between an inner face of the body case and an outer face of the capacitor element; and
   a sealing member that seals the opening,
   wherein
      the solution has a sealing member deterioration preventing agent dissolved in a lipophilic solvent,
      the liquid supply sheet has:
         an absorption portion that makes contact with the separator to absorb the solution; and
         a supply portion that makes contact with the sealing member to supply it with the solution,
      the absorption portion of the liquid supply sheet is arranged to face the end wall part, and the liquid supply sheet bends from the absorption portion to extend in an axial direction along the inner circumferential face of the body case,
      the liquid supply sheet protrudes beyond the capacitor element toward the sealing member, and
      the supply portion of the liquid supply sheet extending in the axial direction is bent in a radial direction to be arranged to face the sealing member.

2. The capacitor according to claim 1, wherein opposite end parts of the liquid supply sheet are bent from the absorption portion to form the supplying portion in the opposite end parts.

3. The capacitor according to claim 1, wherein
   a width of the separator in the axial direction is greater than a width of the anode and cathode foils in the axial direction, and
   the separator protrudes beyond the anode and cathode foils toward the end wall part.

4. The capacitor according to claim 1, wherein
   the solution supplied to the sealing member through the supply portion permeates the sealing member,
   a coating resulting from the sealing member deterioration preventing agent solidifying by oxidation covers an outer face of the sealing member, and
   the solution is present on a capacitor element side of the coating, inside the sealing member.

5. The capacitor according to claim 1, wherein the capacitor element holds a solid electrolyte.

6. The capacitor according to claim 1, wherein the solution is an electrolytic solution having, dissolved in the lipophilic solvent, the sealing member deterioration preventing agent and an electrolyte.

7. The capacitor according to claim 6, wherein a concentration of the sealing member deterioration preventing agent in the electrolytic solution is from 1% by weight to 90% by weight.

8. The capacitor according to claim 6, wherein a concentration of the sealing member deterioration preventing agent in the electrolytic solution is from 3% by weight to 80% by weight.

9. The capacitor according to claim 5, wherein the lipophilic solvent is gamma-butyrolactone.

10. The capacitor according to claim 1, wherein the lipophilic solvent is one of polyethylene glycol, glycerol, and polyglycerol coupled with a lipophilic group.

11. The capacitor according to claim 1, wherein the solution contains:
    the lipophilic solvent;
    one of sulfolane, ethylene glycol, diethylene glycol, and polyethylene glycol; and
    an amphiphilic compound.

12. The capacitor according to claim 1, wherein the sealing member deterioration preventing agent is a lipid-soluble vitamin.

13. The capacitor according to claim 12, wherein the lipid-soluble vitamin is a tocopherol or tocotrienol.

* * * * *